3,180,797
POLYOXYETHYLENE SORBITAN MONOOLEATE SOLUBILIZED ANTI-INFLAMMATORY STEROID OPHTHALMIC COMPOSITIONS
Anthony Francis Cacchillo, Washington, D.C., Lewis Joseph Leeson, Park Ridge, N.J., and James Alfred Lowery, New City, N.Y., assignors to American Cyanamid Company, New York, N.Y., a corporation of Maine
No Drawing. Filed July 5, 1961, Ser. No. 121,816
8 Claims. (Cl. 167—77)

This invention relates to novel compositions of matter, and is particularly directed to the preparation of chemically and physically stable, clear aqueous solutions of anti-inflammatory steroid hormones of the 11β-hydroxy-16α,17α-isopropylidenedioxy-21-carboxyacyloxy-4-pregnene-3,20-dione class such as
11β,21-dihydroxy-16α,17α-isopropylidenedioxy-4-pregnene-3,20-dione hemisuccinate,
9α-fluoro-11β,21-dihydroxy-16α,17α-isopropylidenedioxy-4-pregnene-3,20-dione hemisuccinate,
9α-fluoro-11β,21-dihydroxy-16α,17α-isopropylidenedioxy-1,4-pregnadiene-3,20-dione hemisuccinate,
9α-fluoro-11β,21-dihydroxy-16α,17α-isopropylidenedioxy-1,4-pregnadiene-3,20-dione hemimaleate and
9α-fluoro-11β,21-dihydroxy-16α,17α-isopropylidenedioxy-1,4-pregnadiene-3,20-dione hemiphthalate, which solutions are adapted for topical application to sensitive tissues such as the tissues of the eye, ear, nose, and throat.

The anti-inflammatory steroid hormones employed in the novel compositions of the present invention may be illustrated by the following structural formula:

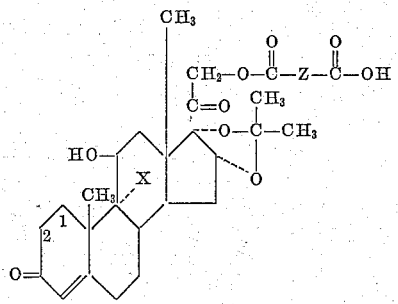

in which the 1:2 position is saturated or double-bonded, X is hydrogen or fluorine, and Z is a divalent hydrocarbon radical of less than 8 carbon atoms. These steroid hormones are, in general, crystalline solids which are sparingly soluble in water. They are crystallizable from organic solvents such as ethyl acetate, acetone, ethyl alcohol, and the like, or mixtures of such solvents such as ethyl acetate-benzene, acetone-benzene, ethyl alcohol-toluene, and the like.

Compositions according to the present invention having the desired clarity, stability, and adaptability for topical application to sensitive tissues are obtained by dissolving from about 0.1% to about 0.7% by weight of the steroid hormone in a vehicle consisting essentially of water and as a solubilizing agent a non-ionic surfactant obtained by condensing sorbitan monooleate and ethylene oxide. The surfactant shall be referred to hereinafter as polyoxyethylene sorbitan monooleate. Using polyoxyethylene sorbitan monooleate as the solubilizing agent in a concentration of from about 5% to about 10% by weight of the vehicle, it is possible to obtain chemically and physically stable, clear solutions of the steroid hormone in concentrations substantially greater than the maximum solubility of the steroid hormone in water at room temperature. It is indeed surprising that no more than 10% by weight of polyoxyethylene sorbitan monooleate is needed to solubilize the steroid hormones employed in the novel compositions of the present invention since heretofore as high as 25% by weight or more of polyoxyethylene sorbitan monooleate has been needed to solubilize other steroid hormones.

The novel solutions of this invention are uniquely characterized by the fact that they may be safely applied to sensitive tissues such as those of the eye, ear, nose, and throat without causing irritation, and by the fact that they contain a sufficiently high concentration of dissolved steroid hormone to bring about effective anti-inflammatory action when applied to such tissues. Heretofore, it had not been possible to obtain clear, chemically, and physically stable solutions of the anti-inflammatory steroid hormones employed in the present invention which were not irritating to sensitive tissues such as those of the eye, ear, nose and throat and at the same time contain a sufficient quantity of the hormone for effective anti-inflammatory action.

In making up solutions according to the present invention, the non-ionic surfactant may be dissolved in the required amount of water, and the steroid hormone may be stirred into the resulting solution at about 75° C. for about one hour or until the desired solution is obtained. Thereafter, any adjuvants such as salts (where isotonic solutions are desired), preservatives, and buffers, may be added. Also, other water-soluble drugs may then be added. It is not necessary, however, that the ingredients be added in any particular sequence. They may be added all at once for example. Advantageously, the non-ionic surfactant may be dissolved in a portion of the required water, say from about 20% to about 50% of that required, and the steroid hormone and other soluble ingredients may then be dissolved in the resulting solution. The balance of the water required in the formulation may then be added. This procedure provides for more facile control of the final concentration and is made possible by the fact that when less than the full quantity of water is used, the concentration of the non-ionic surfactant is proportionally higher, and the dissolving power of the solution is proportionally greater.

The anti-inflammatory steroid hormones employed in the novel compositions of the present invention are prepared by treating a steroid of the 11β,21-dihydroxy-16α,17α-isopropylidenedioxy-4-pregnene-3,20-dione class, as illustrated by the following structural formula:

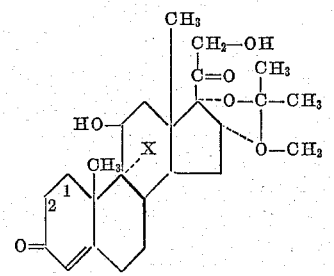

in which the 1:2 position is saturated or double-bonded and X is hydrogen or fluorine, with an anhydride or acyl halide of a dicarboxylic acid of the formula: HOOC—Z—COOH, wherein Z is as hereinbefore defined. The esterification reaction is preferably conducted in the presence of an organic base such as pyridine. Suitable dicarboxylic acids of the formula:

HOOC—Z—COOH which may be used are, for example, malonic, succinic, glutaric, maleic, fumaric, phthalic, isophthalic, and terephthalic.

The intermediate compounds of the 11$\beta$,21-dihydroxy-16$\alpha$,17$\alpha$-isopropylidenedioxy-4-pregnene-3,20-dione class, as set forth above, are prepared by treating a compound of the 11$\beta$,16$\alpha$,17$\alpha$,21-tetrahydroxy-4-pregnene-3,20-dione class, as illustrated by the following structural formula:

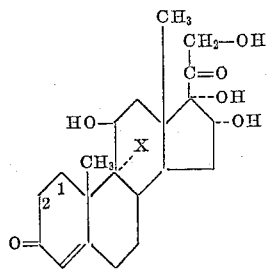

in which the 1:2 position is saturated or double-bonded and X is hydrogen or fluorine, with acetone.

The amount of non-ionic surfactant employed may be varied, but, in view of the purpose for which the compositions are intended, namely, for topical application to sensitive tissues such as tissues of the eye, ear, nose, and throat, it is desirable that the concentration shall not exceed about 10% by weight. Lower concentrations of the non-ionic surfactant, down to about 5% by weight, give clear, stable solutions when the procedures of the present invention are followed. In general, therefore, the concentration of non-ionic surfactant in the formulations according to this invention may range from about 5% to about 10% by weight.

Compositions according to the present invention may have the following general formulation:

|  | Percent by weight |
|---|---|
| Anti-inflammatory steroid hormone | 0.1–0.7 |
| Non-ionic surfactant | 5–10 |
| Preservative | Up to 1.5 |
| Other drugs | Up to 5 |

Water, q.s. ad 100 percent by weight.

The preservatives which may be used to prevent bacterial and fungal contamination of the solutions are, for example, benzyl alcohol, myristyl gamma picolinium chloride, phenyl mercuric nitrate, benzalkonium chloride, phenylethyl alcohol, p-chlorophenyl-$\alpha$-glycerol ether, methyl and propyl parabens, and thimerosal. The other drugs which may be used are generally antibacterial agents, water-soluble antibiotics, and sulfa drugs.

The following examples are illustrative of the novel compositions of this invention:

EXAMPLE 1

*Preparation of 11$\beta$,21-dihydroxy-16$\alpha$,17$\alpha$-isopropylidenedioxy-4-pregnene-3,20-dione*

Perchloric acid (5 drops; 70%) is added to a stirred suspension of 11$\beta$,16$\alpha$,17$\alpha$,21-tetrahydroxy-4-pregnene-3,20-dione (500 mg.) in acetone (50 ml.). Solution takes place rapidly and the mixture is kept at room temperature for 18 hours when it is diluted with water (200 ml.). The solid which separates is extracted in chloroform (3 x 50 ml.) and the combined extracts are washed with water (50 ml.) and dride over anhydrous sodium sulfate. Evaporation of the solvent followed by crystallization of the residue from ethyl acetate-petroleum ether gives 11$\beta$,21-dihydroxy-16$\alpha$,17$\alpha$-isopropylidenedioxy-4-pregnene-3,20-dione as needles (300 mg.), melting point 203°–205° C.

EXAMPLE 2

*Preparation of 11$\beta$,21-dihydroxy-16$\alpha$,17$\alpha$-isopropylidenedioxy-4-pregnene-3,20-dione hemisuccinate*

Two and one-half grams of 11$\beta$,21-dihydroxy-16$\alpha$,17$\alpha$-isopropylidenedioxy-4-pregnene-3,20-dione is dissolved in approximately 18 ml. of pyridine and 1 gram of succinic anhydride is added to the solution. The resulting solution is allowed to stand for approximately 24 hours at room temperature. About 20 ml. of dioxane is added, and then approximately 25 ml. of water. Dilute hydrochloric acid is added to the mixture, with stirring, until precipitation is complete. The resulting suspension is chilled overnight and then filtered. The filtered solids are dried in the air at room temperature and then recrystallized from methanol-water solution. The resulting product is a white crystalline solid.

EXAMPLE 3

*Preparation of 9$\alpha$-fluoro-11$\beta$,21-dihydroxy-16$\alpha$,17$\alpha$-isopropylidenedioxy-4-pregnene-3,20-dione*

A solution of 9$\alpha$-fluoro-11$\beta$,16$\alpha$,17$\alpha$,21-tetrahydroxy-4-pregnene-3,20-dione (200 mg.) in 50 ml. of hot acetone is treated with 5 drops of concentrated hydrochloric acid and boiled for 3 minutes. After standing at room temperature for 17 hours, the reaction mixture is poured into dilute sodium bicarbonate solution and extracted with ethyl acetate. The extract is washed with saturated saline solution, dried, and evaporated to a colorless glass. Crystallization of the residue from acetone-petroleum ether gives 152 mg. of product, melting point 261.5°–262.5° C. dec. (with previous softening and browning). Re-crystallization from acetone-petroleum ether gives 145 mg. of pure 9$\alpha$-fluoro-11$\beta$,21-dihydroxy-16$\alpha$,17$\alpha$-isopropylidenedioxy-4-pregnene-3,20-dione, melting point 262° C. dec. (with previous softening and browning).

EXAMPLE 4

*Preparation of 9$\alpha$-fluoro-11$\beta$,21-dihydroxy-16$\alpha$,17$\alpha$-isopropylidenedioxy-4-pregnene-3,20-dione hemisuccinate*

Two and one-half grams of 9$\alpha$-fluoro-11$\beta$,21-dihydroxy-16$\alpha$,17$\alpha$-isopropylidenedioxy-4-pregnene-3,20-dione is dissolved in approximately 18 ml. of pyridine and 1 gram of succinic anhydride is added to the solution. The resulting solution is allowed to stand for approximately 24 hours at room temperature, after which time 20 ml. of dioxane is added, and then approximately 75 ml. of water. Dilute hydrochloric acid is then added, with stirring, until precipitation is complete. The resulting suspension is chilled overnight, and then filtered. The filtered solids are dried in the air at room temperature and then recrystallized from methanol-water solution. The resulting product is a white crystalline solid.

EXAMPLE 5

*Preparation of 9$\alpha$-fluoro-11$\beta$,21-dihydroxy-16$\alpha$,17$\alpha$-isopropylidenedioxy-1,4-pregnadiene-3,20-dione*

A solution of 250 mg. of 9$\alpha$-fluoro-11$\beta$,16$\alpha$,17$\alpha$-21-tetrahydroxy-1,4-pregnadiene-3,20-dione in 70 ml. of acetone and 7 drops of concentrated hydrochloric acid is boiled for 3 minutes. After standing at room temperature for 17 hours, the reaction mixture is poured into dilute sodium bicarbonate solution and extracted with ethyl acetate. The extract is washed with saturated saline solution, dried, and evaporated to a colorless glass. Crystallization of the residue from acetone-petroleum ether gives 166 mg. of the acetonide, melting point 270°–274° C. dec. (with previous softening and browning). Three re-crystallizations from acetone-petroleum ether gives 113 mg. of 9$\alpha$-fluoro-11$\beta$,21-dihydroxy-16$\alpha$,17$\alpha$-isopropylidenedioxy-1,4-pregnadiene-3,20-dione, melting point 274°–279° C. dec. (with previous softening and browning).

EXAMPLE 6

*Preparation of 9α - fluoro - 11β,21-dihydroxy-16α,17α-isopropylidenedioxy-1,4-pregnadiene-3,20 - dione hemisuccinate*

To 20 ml. of pyridine is added 4.3 g. of 9α-fluoro-11β,-21-dihydroxy-16α,17α-isopropylidenedioxy-1,4-pregnadiene-3,20-dione and 2 g. of succinic anhydride. The suspension is allowed to stand at room temperature for 48 hours with occasional shaking during which time the mixture becomes clear. The clear solution is then poured, with rapid stirring, into 100 ml. of cold dilute sulfuric acid. A tan precipitate which separates out is washed, dried, and then recrystallized from chloroform and n-heptane. The resulting product is a white crystalline solid.

EXAMPLE 7

*Preparation of 9α-fluoro-11β,21-dihydroxy-16α,17α-isopropylidenedioxy-1,4-pregnadiene-3,20-dione hemimaleate*

Two and one-half grams of 9α-fluoro-11β,21-dihydroxy-16α,17α-isopropylidenedioxy-1,4-pregnadiene-3,20-dione is dissolved in 18 ml. of pyridine and 1 gram of maleic anhydride is added. If necessary, a small amount of heat is used to dissolve the anhydride. The solution is permitted to stand at room temperature for 24 hours, after which time 20 ml. of dioxane is added followed by 75 ml. of water. Dilute hydrochloric acid is added, with stirring, until no further precipitation is seen upon addition of the hydrochloric acid. The suspension is refrigerated overnight, filtered, and the precipitate permitted to air dry at room temperature. Re-crystallization from methanol and water results in white crystals of 9α-fluoro-11β,21-dihydroxy-16α,17α-isopropylidenedioxy - 1,4 - pregnadiene-3,20-dione hemimaleate.

EXAMPLE 8

*Preparation of 9α-fluoro-11β,21-dihydroxy-16α,17α-isopropylidenedioxy - 1,4 - pregnadiene - 3,20-dione hemiphthalate*

Two and one-half grams of 9α-fluoro-11β,21-dihydroxy-16α,17α-isopropylidenedioxy-1,4-pregnadiene-3,20-dione is dissolved in 18 ml. of pyridine and 1 gram of phthalic anhydride is added. If necessary, a small amount of heat is used to dissolve the anhydride. The solution is permitted to stand at room temperature for 24 hours, after which time 20 ml. of dioxane is added followed by 75 ml. of water. Dilute hydrochloric acid is added, with stirring, until no further precipitation is seen upon addition of the hydrochloric acid. The suspension is refrigerated overnight, filtered, and the precipitate permitted to air dry at room temperature. Re-crystallization from methanol and water results in white crystals of 9α - fluoro - 11β,21 - dihydroxy - 16α,17α - isopropylidenedioxy-1,4-pregnadiene-3,20-dione hemiphthalate.

EXAMPLE 9

*Aqueous solution of 9α-fluoro-11β,21-dihydroxy-16α,17α - isopropylidenedioxy - 1,4 - pregnadiene-3,20-dione hemisuccinate*

In 20 ml. of water for injection was dissolved 5 grams of polyoxyethylene sorbitan monooleate by stirring while heating to approximately 65° C. Then, 0.105 gram of 9α - fluoro - 11β,21 - dihydroxy - 16α,17α - isopropylidenedioxy-1,4-pregnadiene-3,20-dione hemisuccinate was added and dissolved in the solution by stirring while heating at 75° C. for one hour. The resulting solution was cooled to room temperature, made up to 100 ml. with distilled water, stirred, and allowed to stand overnight at room temperature. The resulting clear solution had a pH of about 5.5, which is adaptable for parenteral preparations.

EXAMPLE 10

*Aqueous solution containing 9α-fluoro-11β,21-dihydroxy-16α,17α - isopropylidenedioxy - 1,4 - pregnadiene-3,20-dione hemisuccinate and neomycin sulfate*

Formulation:                                                              G.
Polyoxyethylene sorbitan monooleate _____                5
9α-fluoro-11β,21-dihydroxy-16α,17α-isopropylidenedioxy-1,4-pregnadiene-3,20-dione hemisuccinate _____ 0.105
Neomycin sulfate _____ 0.525
Benzalkonium chloride _____ 0.02
Water for injection, q.s. ad 100 ml.

Procedure: Dissolve the polyoxyethylene sorbitan monooleate in 20 ml. of the water for injection by stirring while heating to approximately 65° C. Add the 9α-fluoro-11β,21 - dihydroxy-16α,17α-isopropylidenedioxy-1,4-pregnadiene-3,20-dione hemisuccinate and dissolve by stirring while heating at 75° C. for one hour. Cool the solution to room temperature and dissolve the neomycin sulfate and benzalkonium chloride making sure that solution is complete. Then, adjust the volume with water for injection to 100 ml. Pass the solution through a sterile filter, pre-washed with 5% sodium bicarbonate solution and water for injection. There is obtained a clear solution having a pH of about 5.1, which is adaptable for ophthalmic preparations.

EXAMPLE 11

*Aqueous solution containing 9α-fluoro-11β,21-dihydroxy-16α,17α - isopropylidenedioxy - 1,4 - pregnadiene-3,20-dione hemisuccinate and neomycin sulfate*

Formulation:                                                              G.
Polyoxyethylene sorbitan monooleate _____ 15,000
9α - fluoro - 11β,21 - dihydroxy-16α,17α-isopropylidenedioxy - 1,4 - pregnadiene - 3,20-dione hemisuccinate _____ 271
Neomycin sulfate _____ 770
Sodium citrate _____ 3,340
Citric acid, U.S.P. _____ 1,010
Phenyl mercuric nitrate _____ 4
Water for injection, q.s. ad 200,000 ml.

Procedure: Transfer the polyoxyethylene sorbitan monooleate, the 9α-fluoro-11β,21-dihydroxy-16α,17α-isopropylidenedioxy-1,4-pregnadiene-3,20-dione hemisuccinate, and a portion of the water for injection (20–25%) to a suitable container and cautiously heat at about 75–80° C. for one hour with gentle agitation in order to dissolve the steroid. Dissolve, in the following order, the citric acid, the sodium citrate, the phenyl mercuric nitrate, and the neomycin sulfate in a second portion (20–25%) of the water for injection. Cool the steroid solution to below 40° C. with a third portion (30–40%) of the water for injection. Slowly add the citric acid-sodium citrate-phenyl mercuric nitrate-neomycin sulfate solution to the cooled steroid solution with gentle agitation. Adjust the total volume 200,000 ml. with the remaining water for injection and pass the resulting solution through a sterile filter. There is obtained a clear solution having a pH of about 5.0.

EXAMPLE 12

*Aqueous solution of 9α-fluoro-11β,21-dihydroxy-16α,17α-isopropylidenedioxy-1,4-pregnadiene-3,20 - dione hemisuccinate*

Formulation:

Polyoxyethylene sorbitan monooleate ___g__ 5.0
9α-fluoro-11β,21-dihydroxy- 16α,17α - isopropylidenedioxy-1,4-pregnadiene-3,20 - dione hemisuccinate _____g__ 0.1625
Water for injection, q.s. ad. _____ml__ 50

Procedure: In 10 ml. of water was dissolved 10 g. of polyoxyethylene sorbitan monooleate by stirring while heating to approximately 65° C. Then, 0.325 g. of the steroid was added and dissolved by stirring and heating to about 75° C. for one hour. The resulting clear solution was cooled to room temperature, made up to 50 ml. with distilled water, stirred, and allowed to stand overnight at room temperature. Twenty-five ml. of the resulting solution was diluted with an equal volume of distilled water. There was thus obtained 50 ml. of a clear solution having a pH of about 4.95.

EXAMPLE 13

*Aqueous solution of 9α-fluoro-11β,21-dihydroxy-16α,17α-isopropylidenedioxy-1,4-pregnadiene-3,20 - dione hemisuccinate*

In 10 ml. of water was dissolved 5.0 g. of polyoxyethylene sorbitan monooleate by stirring while heating to approximately 65° C. Then, 0.325 g. of 9α-fluoro-11β,21-dihydroxy-16α,17α-isopropylidenedioxy-1,4 - pregnadiene-3,20-dione hemisuccinate was added and dissolved by stirring and heating to about 75° C. for one hour. The resulting solution was cooled to room temperature, made up to 50 ml. with distilled water, stirred, and allowed to stand overnight at room temperature. The resulting clear solution had a pH of about 4.45.

This application is a continuation-in-part of our copending application Serial No. 844,185, filed October 5, 1959, now abandoned.

What is claimed is:

1. A composition of matter comprising an aqueous solution of an anti-inflammatory steroid hormone and as a non-ionic surfactant solubilizing agent, polyoxyethylene sorbitan monooleate, said composition having the following formulation:

| | Percent by weight |
|---|---|
| Steroid hormone | 0.1–0.7 |
| Non-ionic surfactant | 5–10 |
| Preservative | Up to 1.5 |
| Other drugs | Up to 5 |
| Water, q.s. ad. 100 percent by weight | | wherein said anti-inflammatory steroid hormone is selected from the group consisting of those of the formula:

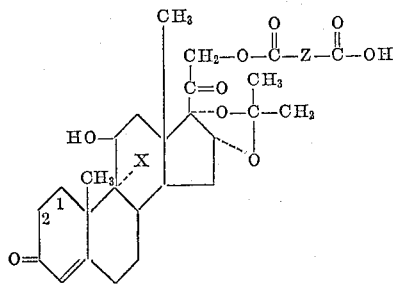

wherein the 1:2 position is saturated, X is selected from the group consisting of hydrogen and fluorine, and Z is a divalent hydrocarbon of less than 8 carbon atoms.

2. A composition of matter comprising an aqueous solution of an anti-inflammatory steroid hormone and as a non-ionic surfactant solubilizing agent, polyoxyethylene sorbitan monooleate, said composition having the following formulation:

| | Percent by weight |
|---|---|
| Steroid hormone | 0.1–0.7 |
| Non-ionic surfactant | 5–10 |
| Preservative | Up to 1.5 |
| Other drugs | Up to 5 |
| Water, q.s. ad. 100 percent by weight | | wherein said anti-inflammatory steroid hormone is selected from the group consisting of 11β,21-dihydroxy-16α,17α-isopropylidenedioxy-4-pregnene-3,20-dione hemisuccinate, 9α-fluoro-11β,21-dihydroxy-16α,17α- isopropylidenedioxy-4-pregnene-3,20-dione hemisuccinate, 9α-fluoro-11β,21-dihydroxy-16α,17α-isopropylidenedioxy-1,4-pregnadiene - 3, 20-dione hemisuccinate, 9α-fluoro-11β,21-dihydroxy-16α,17α-isopropylidenedioxy-1,4-pregnadiene-3,20-dione hemimaleate and 9α-fluoro-11β,21-dihydroxy-16α,17α-isopropylidenedioxy-1,4-pregnadiene-3,20-dione hemiphthalate.

3. A composition of matter comprising an aqueous solution containing from about 5% to about 10% by weight of polyoxyethylene sorbitan monooleate and from about 0.1% to about 0.7% by weight of 11β,21-dihydroxy-16α,17α-isopropylidenedioxy-4-pregnene-3,20-dione hemisuccinate.

4. A composition of matter comprising an aqueous solution containing from about 5% to about 10% by weight of polyoxyethylene sorbitan monooleate and from about 0.1% to about 0.7% by weight of 9α-fluoro-11β,21-dihydroxy - 16α,17α-isopropylidenedioxy-4-pregnene-3,20-dione hemisuccinate.

5. A composition of matter comprising an aqueous solution containing from about 5% to about 10% by weight of polyoxyethylene sorbitan monooleate and from about 0.1% to about 0.7% by weight of 9α-fluoro-11β,21-dihydroxy - 16α,17α-isopropylidenedioxy-1,4-pregnadiene-3,20-dione hemisuccinate.

6. A composition of matter comprising an aqueous solution containing from about 5% to about 10% by weight of polyoxyethylene sorbitan monooleate and from about 0.1% to about 0.7% by weight of 9α-fluoro-11β,21-dihydroxy - 16α,17α-isopropylidenedioxy-1,4-pregnadiene-3,20-dione hemiphthalate.

7. A composition of matter comprising an aqueous solution containing from about 5% to about 10% by weight of polyoxyethylene sorbitan monooleate and from about 0.1% to about 0.7% by weight of 9α-fluoro-11β,21-dihydroxy - 16α,17α-isopropylidenedioxy-1,4-pregnadiene-3,20-dione hemimaleate.

8. A composition of matter comprising an aqueous solution of an anti-inflammatory steroid hormone and as a non-ionic surfactant solubilizing agent, polyoxyethylene sorbitan monooleate, said composition having the following formulation:

| | Percent by weight |
|---|---|
| Steroid hormone | 0.1–0.7 |
| Non-ionic surfactant | 5–10 |
| Preservative | Up to 1.5 |
| Other drugs | Up to 5 |
| Water, q.s. ad 100 percent by weight | | wherein said anti-inflammatory steroid hormone is selected from the group consisting of those of the formula:

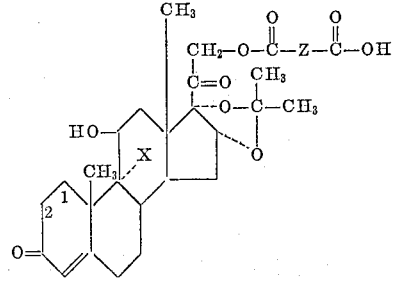

wherein the 1:2 position is double-bonded, X is selected from the group consisting of hydrogen and fluorine, and Z is divalent hydrocarbon of less than 8 carbon atoms.

References Cited in the file of this patent

UNITED STATES PATENTS

| 2,671,750 | Macek | Mar. 9, 1954 |
| 2,736,681 | Tishler | Feb. 28, 1956 |
| 2,871,160 | Johnson | Jan. 27, 1959 |
| 2,880,130 | Johnson | Mar. 31, 1959 |
| 3,073,743 | Spero | Jan. 15, 1963 |

OTHER REFERENCES

Fried et al.: J.A.C.S., vol. 80, pages 2338–2339, May 5, 1958.